(12) United States Patent
Droege et al.

(10) Patent No.: US 9,914,231 B2
(45) Date of Patent: Mar. 13, 2018

(54) DEVICE FOR CUTTING EXTRUDED PLASTIC PROFILES TO LENGTH

(71) Applicant: battenfeld-cincinnati Germany GmbH, Bad Oeyenhausen (DE)

(72) Inventors: Joerg Droege, Kerken (DE); Christian von Hippel, Kempen (DE)

(73) Assignee: BATTENFELD-CINCINNATI GERMANY GMBH, Bad Oeyenhausen (DE)

( * ) Notice: Subject to any disclaimer, the term of this patent is extended or adjusted under 35 U.S.C. 154(b) by 17 days.

(21) Appl. No.: 15/028,739

(22) PCT Filed: Oct. 10, 2014

(86) PCT No.: PCT/EP2014/071819
§ 371 (c)(1),
(2) Date: May 9, 2016

(87) PCT Pub. No.: WO2015/052339
PCT Pub. Date: Apr. 16, 2015

(65) Prior Publication Data
US 2016/0257014 A1    Sep. 8, 2016

(30) Foreign Application Priority Data
Oct. 12, 2013    (DE) .......... 10 2013 220 620

(51) Int. Cl.
*B23B 3/22*    (2006.01)
*B26D 3/16*    (2006.01)
(Continued)

(52) U.S. Cl.
CPC ............. *B26D 3/16* (2013.01); *B26D 1/58* (2013.01); *B26D 1/60* (2013.01); *B26D 5/086* (2013.01);
(Continued)

(58) Field of Classification Search
CPC .... B23B 5/14; B23B 5/16; B23B 3/22; B23B 3/26; Y10T 82/16; Y10T 82/16655;
(Continued)

(56) References Cited

U.S. PATENT DOCUMENTS 3,113,475 A * 12/1963 Lombardo ........ B23B 29/03471
408/152
3,226,741 A * 1/1966 Springer .................. B23G 5/08
408/153

(Continued)

FOREIGN PATENT DOCUMENTS

DE          20104200 U1    6/2001
DE     102007053476 A1    5/2009
EP            34362 A2 *   8/1981

*Primary Examiner* — Daniel Howell
*Assistant Examiner* — Nicole N Ramos
(74) *Attorney, Agent, or Firm* — Leydig, Voit & Mayer, Ltd.

(57) ABSTRACT

A device for cutting a preferably thick-walled, extruded pipe to length, has at least one cutting tool and a receiving unit for the cutting tool. The cutting tool is radially movable in relation to the extrusion axis, is rotatable via a further component about the pipe to be cut to length, in order to cut the pipe to length, and is in operative connection with a ring element, which ring element can be moved via an axial drive, and the depth of penetration of the cutting tool and the path of movement can be defined using an adjustment unit. The depth of penetration of the cutting tool and the path of movement can be defined via the axial drive, wherein toothed rails can be moved more or less in order to achieve the desired depth of penetration.

10 Claims, 4 Drawing Sheets

(51) Int. Cl.
  *B29C 47/00* (2006.01)
  *B26D 1/58* (2006.01)
  *B26D 1/60* (2006.01)
  *B29C 47/34* (2006.01)
  *B26D 5/12* (2006.01)
  *B23B 5/14* (2006.01)
  *B26D 1/16* (2006.01)
  *B26D 5/08* (2006.01)
  *B29K 105/00* (2006.01)
  *B29L 23/00* (2006.01)

(52) U.S. Cl.
  CPC ............ *B26D 5/12* (2013.01); *B29C 47/0023* (2013.01); *B29C 47/0066* (2013.01); *B29C 47/34* (2013.01); *B23B 3/22* (2013.01); *B23B 5/14* (2013.01); *B26D 1/16* (2013.01); *B26D 5/08* (2013.01); *B29K 2105/0067* (2013.01); *B29L 2023/22* (2013.01)

(58) Field of Classification Search
  CPC ....... Y10T 82/167803; Y10T 82/16819; Y10T 82/16951; Y10T 82/22; Y10T 82/2522; Y10T 82/2527
  See application file for complete search history.

(56) References Cited

U.S. PATENT DOCUMENTS

| | | | | |
|---|---|---|---|---|
| 3,365,988 A | * | 1/1968 | Karlan | B23B 51/05 30/310 |
| 4,141,263 A | * | 2/1979 | Leutgab | B23B 31/00 279/4.06 |
| 4,430,913 A | | 2/1984 | Williamson | |
| 4,452,110 A | * | 6/1984 | Emmerson | B23B 5/162 408/130 |
| 4,748,881 A | * | 6/1988 | Keeling | B26D 1/18 82/49 |
| 4,924,684 A | * | 5/1990 | Castricum | B21C 37/124 72/132 |
| 5,189,933 A | * | 3/1993 | Ricci | B23B 3/26 30/97 |
| 5,394,776 A | * | 3/1995 | Robinson | B23B 41/00 30/95 |
| 5,421,229 A | * | 6/1995 | Grossmann | B23Q 5/40 29/27 C |
| 5,609,081 A | | 3/1997 | Lin | |
| 5,941,145 A | * | 8/1999 | Marshall | B23B 5/163 279/123 |

* cited by examiner

DEVICE FOR CUTTING EXTRUDED PLASTIC PROFILES TO LENGTH

CROSS-REFERENCE TO RELATED APPLICATIONS

This application is a U.S. national stage application under 35 U.S.C. § 371 of International Application No. PCT/EP2014/071819, filed on Oct. 10, 2014, and claims benefit to German Patent Application No. DE 10 2013 220 620.8, filed on Oct. 12, 2013. The International Application was published in German on Apr. 16, 2015, as WO 2015/052339 A1 under PCT Article 21(2).

FIELD

The invention relates to a device for cutting to length an extruded tube that preferably has thick walls.

BACKGROUND

In order to cut to length extruded tubes, what are known as flying saws are usually used, a circular saw blade being brought towards the tube to be sawed from below (underfloor saw), from above (plunge saw), or from the side (crosscut saw), plunging into the cross section of the tube, and cutting through the wall thickness in a first step. In a second step, the saw blade is guided around the tube in order to fully cut the tube to length. In this case, the tube that is to be cut to length is clamped during the sawing process. The saw carriage then moves at the extrusion speed synchronously with the continuously progressing extrusion process ("flying saw").

When tubes are sawed, sawdust is produced. In addition, a static charge is generated due to the friction of the saw blade on the tube, in particular in the case of a plastics tube. This is disadvantageous in that the sawdust adheres to the tube, resulting in contamination. The waste material produced often has to be declared as hazardous waste, meaning that it cannot be recycled.

A device in which tubes are cut to length in a chipless manner is already used for small tubes. Rather than a running saw, a round knife is guided around the tube until the tube wall has been cut through.

The chipless cutting just mentioned makes it possible to cleanly cut small tube diameters having a thin cross section, but it has hitherto not been successful in also cutting to length thick-walled tubes having large or very large diameters, i.e. diameters of approximately 2 m. For these tubes, recourse is always made to the saws mentioned further up, resulting in the known disadvantages.

Tests have shown that the main problem lies in precisely guiding the knives through the thick-walled tube. On account of the large thickness and the large diameter, even at the smallest inclination of the knife said knife is canted in the material, which results in the knife breaking.

For cutting units of this kind, the market requirements are for a high linear speed at short cutting lengths and the option of applying a chamfer, for example in sewage pipes made of PP/PVC. Although automatic cutting machines are known that can carry out the cutting process very rapidly, said machines usually have the disadvantage that they cannot produce chamfers or that they are not suitable for all types of plastics material. However, automatic cutting machines which can produce chamfers usually have a comparatively large saw carriage and are therefore slow. The time required to make a cut is thus very long.

In the current machines such as saws (flying saws), tubes having a wide range of diameters are cut through by a cutting knife arm or a saw arm moving around the tube. All the functions necessary for this purpose, such as moving the arm forward and back, clamping/releasing the tube, and the corresponding position feedback are installed on the disc rotating about the tube. For this purpose, slip rings are used for the electrical signals. The usual procedure is to use a dedicated slip ring channel for each signal respectively. The signals, and thus the available functions, are limited by the structural size in smaller machines and by the cost per slip ring.

A solution to the above-described problem is disclosed in DE 20 104 200, but does not yet provide satisfactory results.

DE 10 2007 053 476 A1 discloses a cutting device in which two drives are fixed to a stationary housing outside the rotatable support drum.

SUMMARY

An aspect of the invention provides a device for cutting to length an extruded tube, comprising a cutting tool; and a support unit suitable for the cutting tool, wherein the cutting tool is radially movable with respect to an extrusion axis, wherein the cutting tool is rotatable by a further unit about the extruded tube to be cut to length, in order to cut the tube to length, wherein the cutting tool is operatively connected to an annular element, wherein the annular element is movable using an axial drive, and wherein a penetration depth of the cutting tool and a movement path can be specified using an adjustment unit, wherein the penetration depth of the cutting tool and the movement path can be specified the axial drive, and wherein one or more racks, movable to a greater or lesser extent, are provided for adjustment of the penetration depth.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention relates to a device for cutting to length an extruded tube that preferably has thick walls, comprising at least one cutting tool and a support unit for the cutting tool, the cutting tool being radially movable with respect to the extrusion axis and being rotatable by further means about the tube that is to be cut to length in order to cut the tube to length, the cutting tool being operatively connected to an annular element and the annular element being movable by means of an axial drive, and it being possible to specify the penetration depth of the cutting tool and the movement path by means of an adjustment unit.

The object of the invention is therefore that of developing the known specialized knowledge about a generic cutting device provided with a knife, such that it is possible to provide a device that combines a plurality of functions in one component.

In conjunction with the preamble of claim 1, the solution to the problem is characterized in that the penetration depth of the cutting tool and the movement path can be specified by means of this one axial drive, racks being movable to a greater or lesser extent for the penetration depth.

Due to this design of the device, the movement path and the penetration depth of the cutting tool are produced by means of a single drive, and therefore at least two functions are implemented by one part of the device.

According to a development, it is provided for the axial drive to be adjustable by means of pneumatic cylinders. Therefore, according to the invention, the drive that carries out the plurality of functions is a pneumatic drive.

The adjustment unit comprises limit switches which initiate the change in the movement direction. The position of the limit switches during manual adjustment can be specified using a scale.

However, the limit switches can also be adjusted by means of an electric linear drive. Said drive is advantageously activated by the machine control in the extrusion line. Likewise, the pneumatic cylinder of the axial drive can be an electric drive, for example a servomotor.

The annular element advantageously consists of an inner ring and an outer ring, the outer ring being coupled to the axial drive by means of a connecting part. The annular element can thus be displaced axially without the entire element rotating, since axial forces can be transmitted between the inner ring and the outer ring of the annular element. The outer ring transmits the axial movement of the axial drive to the inner ring and relays said movement to the first rack. Coupling the first rack to the second rack by means of the block makes it possible to achieve an axial into a radial movement of the cutting device by means of a single drive. The radial movement functions as the cutting movement for the cutting device. According to a development, it is proposed to design the annular element as an axial bearing.

Figure 1:
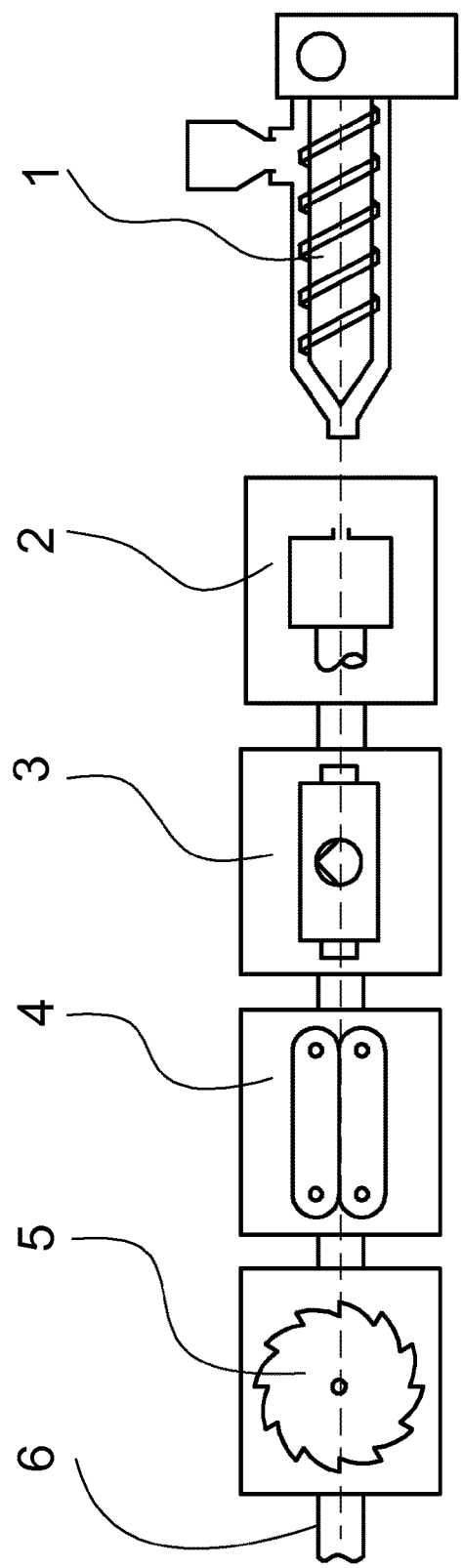
FIG. 1 shows a typical extrusion line.

FIG. 1 shows a typical extrusion line as used currently for profile extrusion, regardless of whether said line is used for producing window profiles or tubes. The figure shows an extruder 1, in which plastics material is melted and continuously conveyed into the extrusion die 2 to be shaped. The die is followed by a calibrating and cooling station 3; depending on the profile, further cooling stations can be used. Downstream of the cooling stations is a take-off device 4. A cutting device 5 is arranged thereafter for cutting the continuous profiles 6 to the desired length.

Figure 2:
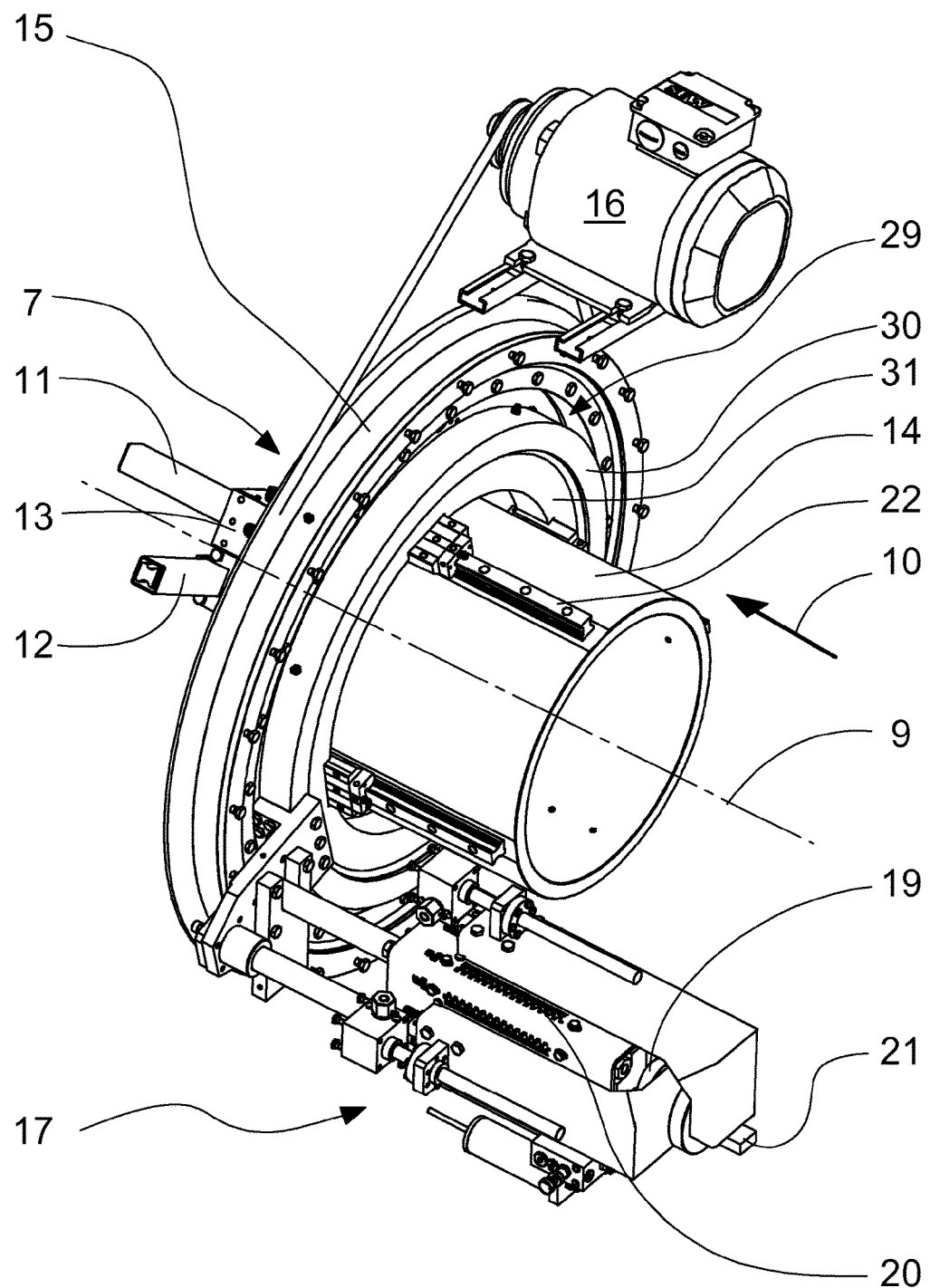
FIG. 2 shows the part of the cutting device.

FIG. 2 is a schematic view of the cutting device according to the invention, and corresponds to position 5 according to the view in FIG. 1. A sleeve 14 comprising linear guides 22 is arranged about the extrusion axis 9, which sleeve is operatively connected to an annular element 29. Cutting tools 7 are arranged on the support disc 15 and are adjusted by means of racks 11 and 12.

The annular element 29 consists of an inner ring 31 and an outer ring 30 that is coupled to the axial drive 17 by means of the connecting part 32. A pneumatic cylinder 19, the direction of which is changed by means of limit switches 21, functions as the drive. A scale 20 is used to determine the position of the limit switches 21 during manual adjustment.

The annular element 29 consists of an inner ring 30 and an outer ring 31 that is coupled to the axial drive 17 by means of the connecting part 32. A pneumatic cylinder 19, the direction of which is changed by means of limit switches 21, functions as the drive. A scale 20 is used to determine the position of the limit switches 21 during manual adjustment.

Depending on the position of the limit switches 21, the racks 11 and 12 are moved to a greater or lesser extent by the pneumatic cylinder 19, and the penetration depth of the cutting tool 7 into the tube 6 that is to be cut to length is thus specified. The rotary drive 16 for the support disc 15 is also shown, which drive rotates the cutting knife or knives about the tube that is to be cut to length.

Figure 3:
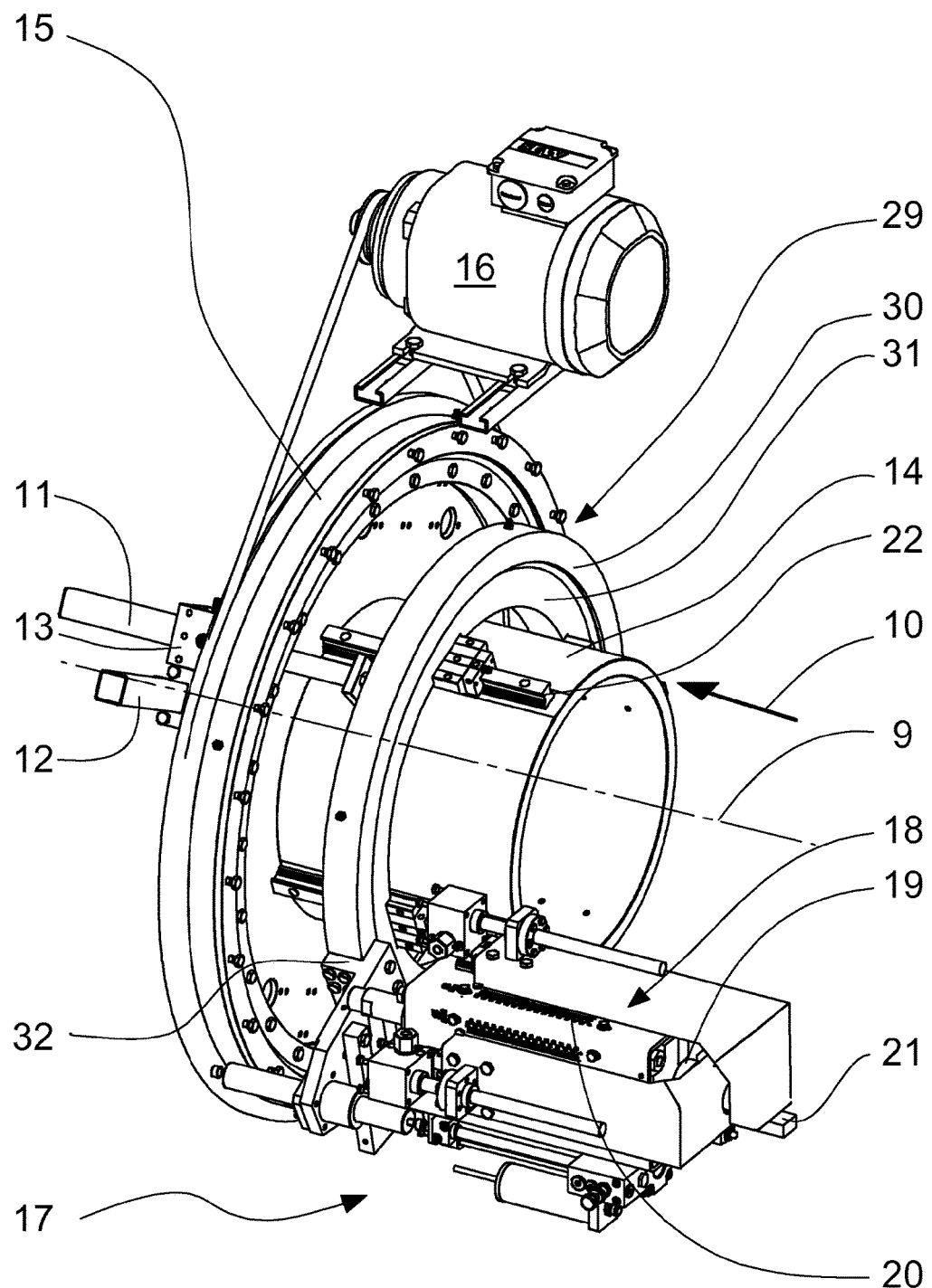
FIG. 3 shows the part of the cutting device in a different position.

FIG. 3 substantially corresponds to the view according to FIG. 2. The difference consists in the fact that the annular element 29 is shown in a different position. The annular element 29 has been displaced axially by means of the axial drive 17. The outer ring 30 of the annular element 29 is coupled to the axial drive 17 by means of the connecting part 32. The outer ring 30 transmits the axial forces to the inner ring 31 and moves the annular element 29 along the linear guides 22 and in the extrusion direction 10. The inner ring 31 of the annular element 29 is connected to the first rack 11 of the cutting device. The second rack 12 is simultaneously moved in the radial direction on account of the racks being coupled by means of the block 13. Since the cutting knife is arranged above the support unit on the rack 12, the tube (not shown) is cut to length.

Figure 4:
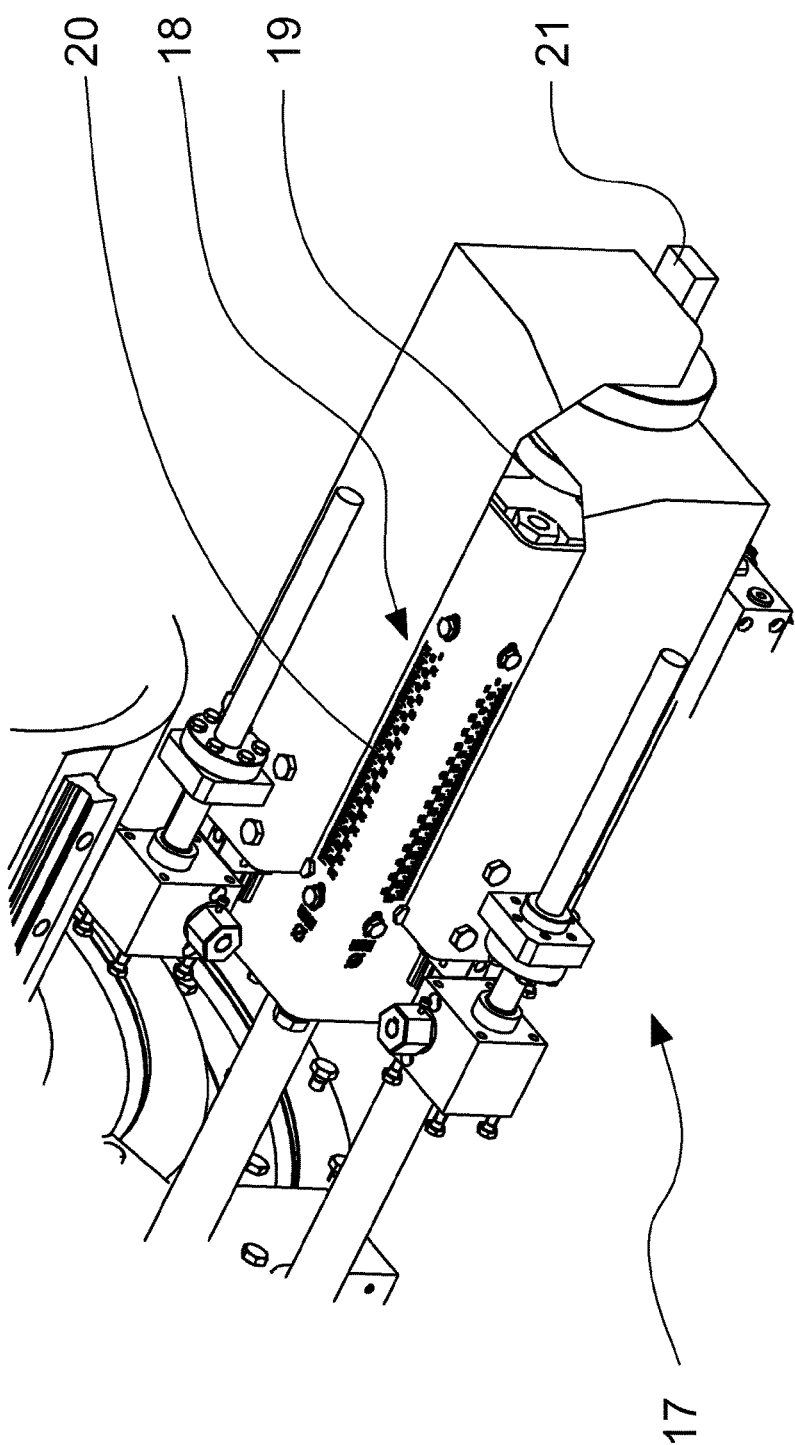
FIG. 4 is an enlarged detail of the adjustment unit.

FIG. 4 is an enlarged view of the part of the adjustment unit 18 from FIG. 2, like parts being denoted by like reference signs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

1 Extruder
2 Extrusion die
3 Calibrating and cooling tank
4 Take-off device
5 Cutting device 6 Profile
7 Cutting tool
8
9 Extrusion axis
10 Extrusion direction
11 first rack (parallel)
12 second rack (radial)
13 Block
14 Sleeve
15 Support disc
16 Rotary drive for 15
17 Axial drive for 29
18 Adjustment unit
19 Pneumatic cylinder
20 Scale
21 Limit switch
22 Linear guide
29 Annular element
30 Outer ring of 29
31 Inner ring of 29
32 Connecting part

The invention claimed is:

1. A device for cutting to length an extruded tube having an extrusion axis, comprising:
   a cutting tool; and
   a support unit suitable for the cutting tool,
   wherein the cutting tool is radially movable with respect to the extrusion axis,
   wherein the cutting tool is rotatable by a further unit about the extruded tube to be cut to length, in order to cut the tube to length,
   wherein the cutting tool is operatively connected to an annular element, the annular element being movable using an axial drive, the annular element comprising an inner ring and an outer ring,
   wherein a penetration depth of the cutting tool and a movement path are configured to be specified using an adjustment unit,
   wherein the penetration depth of the cutting tool and the movement path are configured to be specified by the axial drive, and
   wherein one or more movable racks are provided for adjustment of the penetration depth.

2. The device of claim 1, wherein the axial drive is adjustable using one or more pneumatic cylinders.

3. The device of claim 2, wherein the adjustment unit includes a scale.

4. The device of claim 2, further comprising
   at least one limit switch configured to initiate a change in a movement direction of the axial drive.

5. The device of claim 4, wherein the at least one limit switch is manually adjustable.

6. The device of claim 1, further comprising a connecting part,
   wherein the annular element is coupled to the axial drive using the outer ring and the connecting part.

7. The device of claim 1, configured such that axial forces are configured to be transmitted between the inner ring and the outer ring.

8. The device of claim 1, wherein the annular element comprises an axial bearing.

9. The device of claim 1, comprising two or more cutting tools.

10. The device of claim 1, wherein the annular element includes an axial bearing.

* * * * *